Sept. 9, 1930.    T. A. KEEN    1,775,493
STARTING CAGE FOR RACING DOGS AND THE LIKE
Filed Feb. 14, 1928
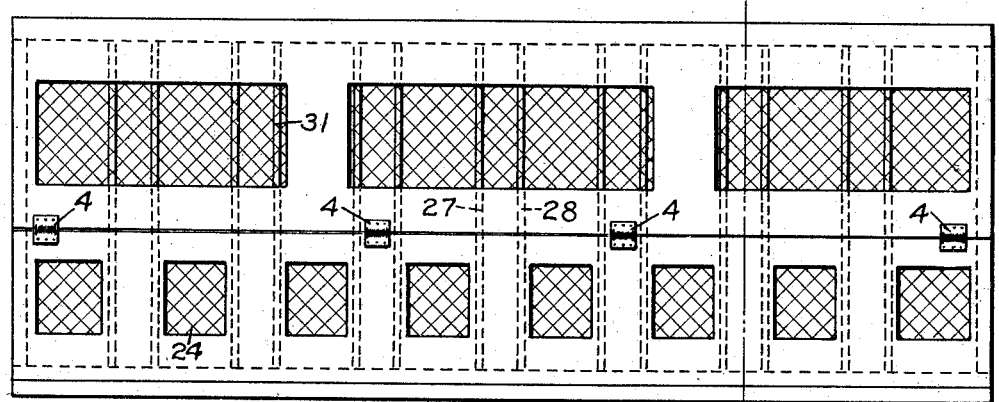
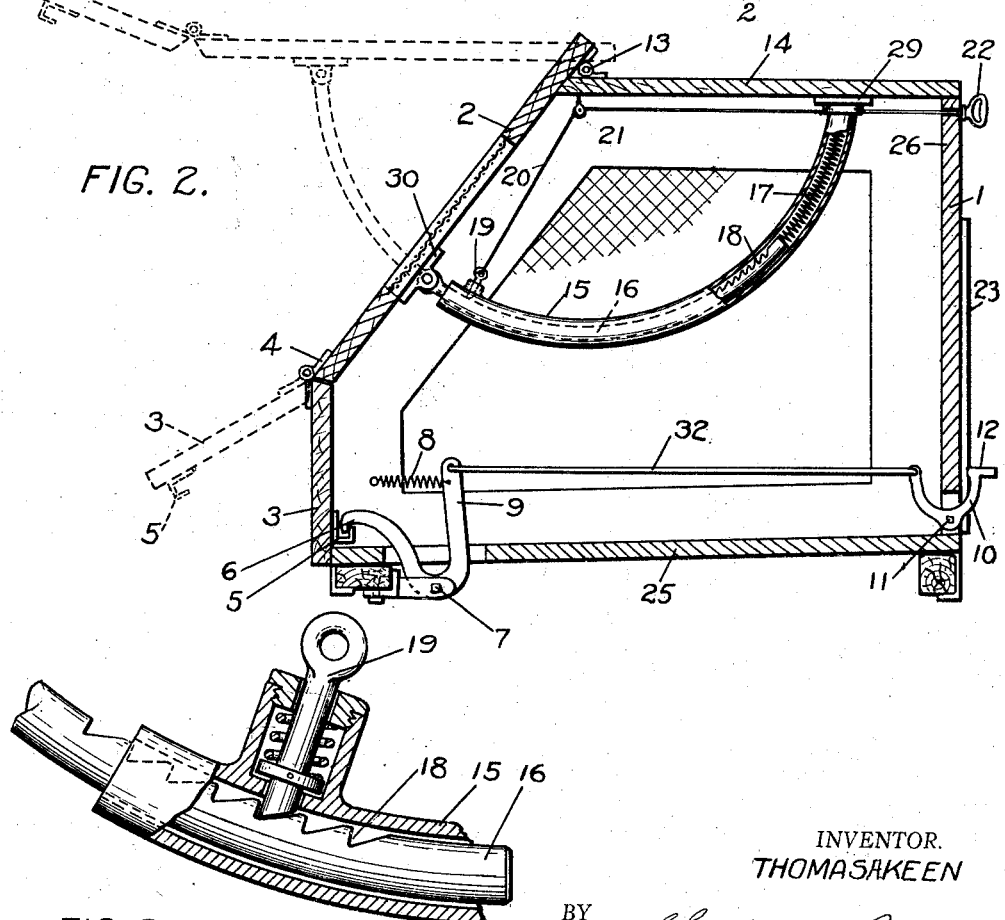
INVENTOR.
THOMAS A KEEN
BY
ATTORNEY.

Patented Sept. 9, 1930

1,775,493

UNITED STATES PATENT OFFICE

THOMAS A. KEEN, OF MIAMI, FLORIDA, ASSIGNOR TO HANNAH MARY SMITH, OF MIAMI, FLORIDA

STARTING CAGE FOR RACING DOGS AND THE LIKE

Application filed February 14, 1928. Serial No. 254,211.

The present invention relates to starting cages employed on dog racing tracks, to hold the dogs entered in the race preparatory to starting them on the race. For this purpose, the cage is usually constructed with a separate compartment for each dog, and its operation so arranged that the front will be opened simultaneously for all of the compartments. As the greyhounds usually started in such races are very quick in their movement, it frequently happens that the dogs will collide with the door, in case it does not open quickly enough to permit them to pass through on their attempt to start on the race. This causes delay, to the dog so colliding with the door, and also may cause serious injury to such dog.

One of the objects of the present invention is to provide means which will open the door to the cage very quickly when it is released for the start of the dogs.

Another object is to provide a front door in two sections, each section acted upon independently by springs to remove it from the path of the starting dogs as quickly as possible.

Another object is to construct a starting cage which can be easily and quickly operated with as little manual effort as possible.

With the above, and other objects in view which will more clearly appear from the description following, I have shown in the accompanying illustrations one embodiment of my invention, which consists of the combination and arrangement of parts to accomplish the results hereinafter set forth. In the accompanying drawings, reference numerals refer to the same parts throughout the various views, and, Figure 1 shows a front elevation of a cage embracing my said improvements.

Figure 2 is a transverse section view taken along the line x—x of Figure 1.

Figure 3 is a detail view of the means for locking the door open after starting each race.

The starting cage illustrated in the present invention comprises a box like structure as shown, with usual top, bottom, ends and rear indicated at 14, 25 and 26. In general practice the front of the cage is closed by a door as 2, hinged to the cage at the top at 13, and adapted to be raised by some power when released. In the present construction, I have preferably constructed the front door in two sections, the main section 2 placed at an angle sloping forwardly, as shown, when closed, and a lower section 3, which I have shown as vertical when closed, attached to said upper section by means of spring hinges 4, which swing said lower section outwardly and upwardly, with reference to the cage, and also with reference to the upper section 2 whenever the front door is released, as herein described. To hold the door closed prior to the starting of the race, some suitable latch is provided, such as the keep 5, which is engaged by the forward end of the latch element 6, in the present instance shown in the form of a bell crank, pivoted at 7, and held in engagement with the keep by means of a spring 8 attached at one end to the arm 9 of the bell crank, and at the other end to some stationary portion of the cage. A rod 32 connects the end 9 of the first bell crank with one arm of the second bell crank 10 at the rear of the cage, which said bell crank 10 is pivoted at 11, and has the end 12 extending out in the rear of the cage in position to be operated by the man in charge when desired to release the front door and release the dogs in the race. It is usual practice to divide the cage into compartments, one for each dog, and in the present construction, I have provided double partitions, 27 and 28 leaving a space between said partitions for the installation of the means for operating the door hereinafter described. The means which I have employed to open the door 2 in the present construction consists generally of a tube 15 attached to the frame of the cage as at 29, and extending forward toward the door 2. Within this tube I have mounted a rod or piston 16, having its forward end attached to the door 2 by hinge joint as at 30. Also within the tube 15, and in the rear of the rod 16 I have provided a compression spring 17 of suitable tension to be compressed when the door 2 is closed, as shown in Figure 2, and the rod 16 is forced thereby back into the tube, and to push said rod and said door outwardly as required, whenever the door is released so that the spring may act thereon as above set forth. To hold the door 2 open, when desired I have provided notches as 18 near the rear end of the rod 16, and I have also mounted upon the tube 15 near its forward end, a spring latch 19, the bolt of which passes through the tube 15, and engages the notches 18 whenever the door 2 is pushed open by the spring, and the rod is pushed outwardly until the spring latch is in operative position above said notches at 18. To operate the spring latch and release the door 2 to permit closing the same, there is provided a cord or cable 20 attached to said latch at one end, and extending to the outside of the cage, as over the pulley 21 at the top of the cage, and rearwardly through the rear of the cage, and terminating in a handle 22 for manipulation thereof when desired to release the door.

As the dogs pass out through the lower portion of the door as soon as the door is raised enough to permit them to pass therethrough, I have made the lower section 3 of sufficient height to permit the dogs to pass, and I have also made it much smaller and lighter than the upper portion, that it might be acted upon more quickly by the spring hinges 4. To further lighten the said doors 2 and 3, I have further constructed them of open frames as shown, leaving open spaces as at 24 and 31, which in turn are enclosed by any light material, as glass, woven wire, spaced rods or similar closing means. At the rear there are usually provided vertically sliding doors 23, one for each compartment, to admit the dogs before the races.

As generally used, this cage is placed upon or near the race course, with the front door closed, sometimes several cages are used one placed at each position around the course where it is desired to start the dogs for any desired length of race. The required number of dogs are placed within the cage, through the doors 23 in the rear, one dog in each compartment, with their heads turned forward toward the front door, and toward the direction in which they are to race. When the door 2, 3 is forced downward from the position shown in the dotted lines, Figure 2, to the position shown by solid lines in said figure (by any usual means) it will be seen that the spring 17 is greatly compressed by the rod 16, and a suitable tension will also be placed upon the spring 4, the keep 6, in engagement with the latch member 5 retaining said door in closed position until released by the operator.

When the starting judge indicates the time to start the dogs in the race, the operator presses downwardly (usually with his foot) upon the end 12 of the bell crank 10, thereby releasing the latch 5 from the keep 6 through the action of the rod 32 and the bell crank 9 against the pressure of the spring 8 which had retained said latch in engagement with said keep 6 to hold said door closed thereby.

When the front door is released from the latch 5, the spring 17 throws the door 2, carrying the section 3 outwardly and upwardly as rapidly as the strength of the spring is capable, and at the same time the spring in the hinge 4 throws the lower section 3 outwardly and upwardly out of the way of the dogs as shown in the dotted lines in Figure 2. By mounting the upper section 2 of the door at the angle shown, I find that it has to move through a much shorter distance to pass from closed position to open position, than would be the case if it were mounted vertically as has been formerly done in constructing starting cages, and for this reason, the door can be moved through the shorter arc by the force of the spring 17 much more quickly than it could possibly be moved through the greater arc as required in previous construction. Also, by making the lower section in a separate section, much lighter than the upper section, and operated by a separate spring, by reason of its lighter weight, the inertia is more quickly overcome, and its outward movement is more rapid than would be possible if it were solidly attached as part of the upper section. As soon as the lower section 3 has been raised by the action of the spring 4 to a horizontal position, it will be apparent that the dogs will have sufficient space to pass through the door, and start upon the race, without danger of collision with the said door or any part thereof. Also by using two springs, instead of one, it will be apparent that a doubly quick action is secured, and a much quicker opening of the door is secured as a result thereof.

While I have shown the cage as employed in starting racing dogs, it will be apparent that it is equally well adapted for starting other races where adaptable to the purpose. While I have only shown in detail one latch, and one spring actuated rod and tube, it will be apparent that as many latches, and as many spring actuated rods and tubes may be employed as is required to secure the most desirable results. While I have shown the use of springs to force the rod 16 outwardly to raise the door, it will be apparent that other means for accomplishing said result may be employed, such as compressed air, or other suitable force to accomplish the same purpose. Also, while I have shown the two spring means for opening the door quickly, it will be apparent, that additional springs, or resilient means may be employed, to add additional pressure against said doors when released. While I have shown the present construction of tube 15 and the rod 16 as in the shape of an arc of the circle through which the door moves upon its hinges, yet it will be apparent that said tube and rod could be made straight, and would operate the said door equally well.

Suitable means may be employed to limit the outward movement of the door 2, such as suitable chains or other means suitably attached to the structure at one end, with the reverse end attached at a suitable place to the door to check its movement at a desired elevation.

Having thus described my invention, what I claim, and desire to secure by Letters Patent, is the following:

1. In a device of the class described, the combination of a box-like structure divided into a plurality of compartments, a door composed of longitudinal sections hinged together for closing the front opening in all of said compartments, said door being hinged at the top, a latch for holding said door closed, and a plurality of resilient means for opening said sections when released from the latch.

2. A starting cage for racing dogs and the like comprising a box like structure divided into a plurality of compartments, a door hinged at the top composed of longitudinal sections hinged together and extending across the front of the box to close all of the compartments, resilient means connected with the upper section of the door for automatically opening said door when released, and separate resilient means connected with the lower section for opening said lower section when released.

3. In a starting cage for racing dogs and the like, the combination of a box-like structure divided into a plurality of compartments all opening at the front, a door hinged at the top for closing the front opening in all of said compartments, said door being composed of longitudinal sections hinged together, resilient means attached to the upper section for opening said door when released, additional resilient means attached to the lower section of the door for opening said lower section when released, a latch for holding said door closed, and means for releasing said latch.

4. A starting cage for racing dogs comprising a box-like structure divided into a plurality of compartments, a door comprising a plurality of sections joined together by spring actuated hinges said door extending across the front of said cage normally closing all the compartments, a plurality of tubes attached to the structure, springs disposed within said tubes, rods attached to the door and slidably mounted with relation to said tubes adapted to be actuated by the springs within said tubes, means for holding said door closed and means for releasing said holding means to release the door.

5. A starting cage for racing dogs and the like comprising a box-like compartmented structure, the top thereof ending further rearward than the bottom and having a bevelled forward edge, a door hinged to said top inclined at the angle of the bevel and extending forwardly and downwardly to a point above the forward edge of said bottom, a vertical door spring-hinged to said inclined door and normally substantially aligned therewith, means for latching said vertical door in vertical position closing said structure, means urging said inclined door to horizontal position, means for releasing said latching means and means for locking said inclined door in the immediately assumed horizontal position.

6. A starting cage for racing dogs and the like comprising a box-like compartmented structure, the top thereof ending further rearward than the bottom and having a bevelled forward edge, a door abutting said bevelled edge and assuming the inclination thereof and extending forwardly and downwardly to a point above the forward edge of said bottom, a spring-hinged door connected to said inclined door and normally substantially aligned therewith, means for latching said spring-hinged door into vertical position thus closing said structure, said means normally tending towards latched position, means urging said inclined door into horizontal position, means for releasing said latching means and consequently said doors which immediately assume horizontal positions, and means for automatically locking said doors in said horizontal position.

7. In a device of the character described, a top having a forward bevelled edge, a door abutting said bevelled edge and assuming the inclination thereof, a generally forwardly and downwardly extending tube secured to the under side of said top, a compressible spring therein adjacent said top, a spring latch in said tube at the forward end thereof, a generally rearwardly and upwardly extending rod secured to the rearward side of said door and receivable in said tube, so as to compress said spring and slots in the end of said rod, said rod and spring normally urging said door into horizontal position, said spring latch and slots locking said door in said position, and means for releasing said latch and slots whereby said door may be positioned again in inclined position.

8. In a device of the character described, a bottom, a rear, a top having a forward bevelled edge, a door abutting the same and assuming its inclination, cooperating means on said top and door normally urging said door into horizontal position, a smaller lighter door springedly hinged to said inclined door so as normally to be in substantial alignment therewith, means for latching said smaller door in vertical position and means for releasing said latching means, said means comprising a keep on said door, a pivoted bell crank lever having an end normally in said keep, a spring connecting said device to the other end of said bell crank lever, a rod connected to the latter end of said bell crank lever and extending rearwardly therefrom, a second bell crank lever pivoted to the rear of said device, said rod being connected to the forward arm of said second bell crank lever, the rearward arm of said bell crank lever serving as release actuating means.

In testimony whereof, I have duly signed the foregoing specification.

THOMAS A. KEEN.